United States Patent [19]
Moh et al.

[11] Patent Number: 5,382,890
[45] Date of Patent: Jan. 17, 1995

[54] INTEGRATED CIRCUIT DRIVER HAVING CURRENT LIMITER FOR BRUSHLESS MOTOR

[75] Inventors: Sungwon R. Moh, Wilton; Scott T. Potter, Fairfield; Frank D. Ramirez, Stamford; Edilberto I. Salazar, Brookfield, all of Conn.

[73] Assignee: Pitney Bowes Inc., Stamford, Conn.

[21] Appl. No.: 18,597

[22] Filed: Feb. 17, 1993

[51] Int. Cl.$^6$ .............................................. H02P 6/00
[52] U.S. Cl. ........................... 318/254; 318/439; 318/434
[58] Field of Search .............. 318/254, 138, 429, 434; 361/23, 31

[56] References Cited

U.S. PATENT DOCUMENTS

| | | | |
|---|---|---|---|
| 4,403,177 | 9/1983 | Weber et al. | 318/254 |
| 4,528,488 | 7/1985 | Flaig et al. | 318/254 |
| 4,535,276 | 8/1985 | Yokobori | 318/254 |
| 4,544,868 | 10/1985 | Murty | 318/254 |
| 4,574,226 | 3/1986 | Binder | 318/434 |
| 4,677,356 | 6/1987 | Tsuneda et al. | 318/254 X |
| 4,678,973 | 7/1987 | Elliott et al. | 318/138 X |
| 4,749,923 | 6/1988 | Chieng | 318/254 X |
| 4,760,316 | 7/1988 | Hedlund | 318/254 |
| 4,763,052 | 8/1988 | Lundin et al. | 318/254 |
| 4,810,943 | 3/1989 | Kawaguchi et al. | 318/434 |
| 4,814,674 | 3/1989 | Hrassky | 318/254 |
| 5,010,282 | 4/1991 | Moberg | 318/254 |
| 5,012,166 | 4/1991 | Ushijima et al. | 318/254 |

Primary Examiner—Jonathan Wysocki
Attorney, Agent, or Firm—Charles G. Parks, Jr.; Melvin J. Scolnick

[57] ABSTRACT

An integrated circuit driver for a brushless motor having an encoder which includes a plurality of Hall-effect sensors operative for providing commutation information to a motor controller includes a commutation decoding section for decoding the commutation information from the Hall-effect sensors and an analog current limiter. The current limiter includes a circuit for dynamically switching the current limit values for current in the motor between a high current limit value and a low current limit value based on the average or RMS value of the motor winding current. The current limit values must be provided externally. A Hall-effect sensor quadrature encoder is provided on the integrated circuit and a selection switch allows for the selection of a quadrature output from an external optical encoder or the internal Hall-effect sensor encoder.

11 Claims, 13 Drawing Sheets

CHIP BLOCK DIAGRAM

DIFFERENTIAL AMPLIFIER WITH LEVEL SHIFT

SAMPLE AND HOLD CIRCUIT

WINDOW COMPARATOR

PULSE BY PULSE COMPARATOR

TIMING DIAGRAM OF THE CL_TRIP_B SIGNAL

SAMPLE CLOCK GENERATOR

SAMPLE CLOCK GENERATOR WITH CL_TRIP_B SIGNAL

TIMING DIAGRAM OF THE DEAD TIME GENERATOR

INTEGRATED CIRCUIT DRIVER HAVING CURRENT LIMITER FOR BRUSHLESS MOTOR

FIELD OF THE INVENTION

The invention relates to brushless motors having electric commutation means.

BACKGROUND OF THE INVENTION

Brushless motors are well known. Conventionally, these motors comprise a housing rotatably supporting a rotor carrying a plurality of permanent magnets arranged in pole pairs. These magnets supply the field flux. A plurality of stators are are arranged about the rotor. Each stator has stator windings such that the interaction of current passing through the winding with the flux of the rotor magnets produces torque if the current through each stator winding is timed correctly with respect to rotor position.

Typically, brushless motors provide the necessary commutation position feedback information to a motor controller through the use of either an optical encoder mounted on the end of the motor or through Hall effect sensors placed in close proximity to a disc having a magnetic pattern thereon which rotates with the rotor.

U.S. Pat. No. 4,931,712 to DiGiulio et al. entitled Multiple Channel Servo Configuration discloses an arrangement for driving brushless motors in a mailing machine environment.

U.S. Pat. No. 5,010,282 to Moberg suggests the use of an integrated circuit device which eliminates a sense resistor for the motor current by detecting the drain-to-source voltage of a power FET and generating a feedback current that is proportional to it.

U.S. Pat. No. 4,814,674 also teaches the use of a monolithic integrated circuit which includes a pulse shaping circuit for shaping the slope of the driving pulse edges.

U.S. Pat. No. 4,544,868 teaches a pulse-width modulation circuit to monitor the current supplied to the motor and to interrupt motor energization whenever the current rises above a reference level. The circuit is also used to provide regenerative braking whenever the direction of motor rotation is to be reversed.

SUMMARY OF THE INVENTION

It is therefore an object of the invention to provide an integrated circuit driver for commutating a brushless motor and more particularly a device which includes all low-power driver functions which may be placed on the end of the brushless motor.

It is a further object of the invention to provide an integrated circuit driver having an analog current limiter that dynamically switches back and forth between a high current limit and low current limit mode to allow maximum torque available for acceleration without damaging the power-switching FET's and motor windings or demagnetizing the motor.

The aforementioned and other objects are accomplished by providing an integrated circuit driver for a brushless motor having encoder means comprising a plurality of Hall-effect sensors operative for providing commutation information to a motor controller, the integrated circuit comprising means for decoding the commutation information from the Hall-effect sensors, output means connected to said decoding means, said output means being operative for providing switching signals in accordance with the decoded commutation information and an analog current limiter, said current limiter including means for dynamically switching the current limit values for current in the motor between a high current limit value and a low current limit value.

DESCRIPTION OF THE PREFERRED EMBODIMENT

Figure 1:
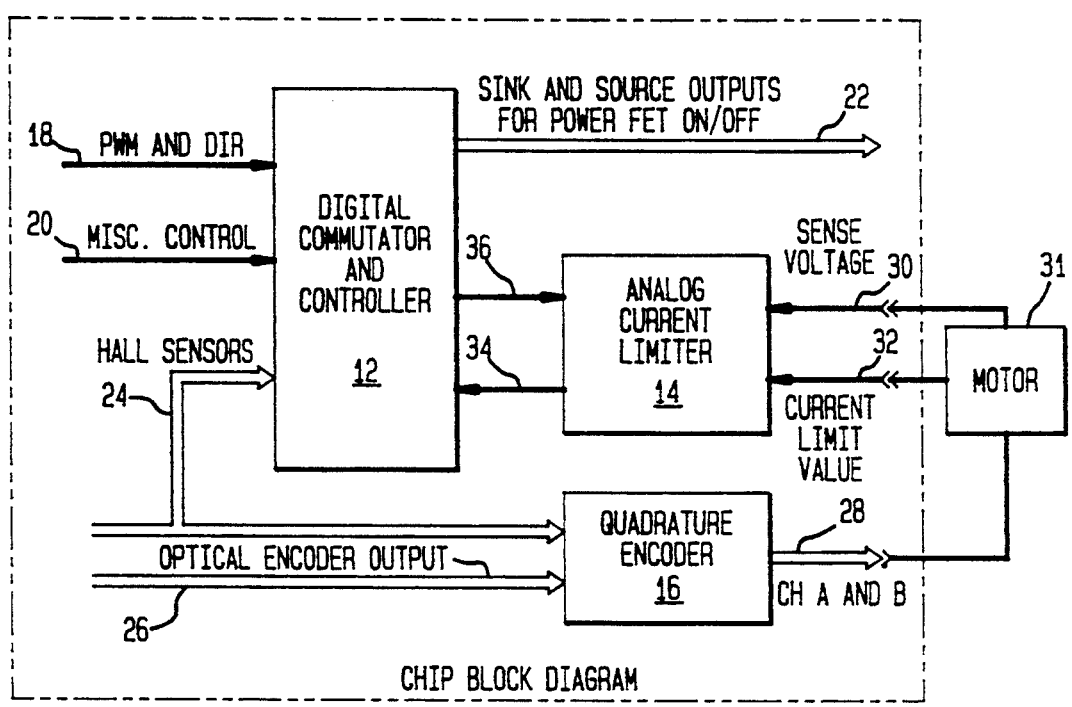
FIG. 1 is a block diagram of an integrated circuit motor driver chip in accordance with the invention.

FIG. 1 shows at 10 an overall block diagram of an integrated motor driver chip in accordance with the invention. The chip 10 comprises a digital commutator and controller functional block shown at 12, an analog current limiter block at 14, and a quadrature encoder block at 16.

The commutator and controller 12 receives a direction and PWM signal indicated at 18 from a central controller (not shown) along with miscellaneous control information at 20 to provide commutated sink and source outputs at 22 for controlling power FET's (not shown) in correspondence with position information provided by Hall sensors fed in at 24.

The Hall sensors also feed quadrature encoder 16. Conventional optical encoder information may also be fed to the encoder as seen at line 26. The quadrature output signals developed from this information are provided on output channels as shown at 28.

The analog current limiter 14 receives sense voltage information at 30 which corresponds to the motor current and develops in accordance with a current limit value provided at 32 control information to the controller 12 along lines 34. Information also passes to the limiter 14 as indicated at 36.

Figure 2:
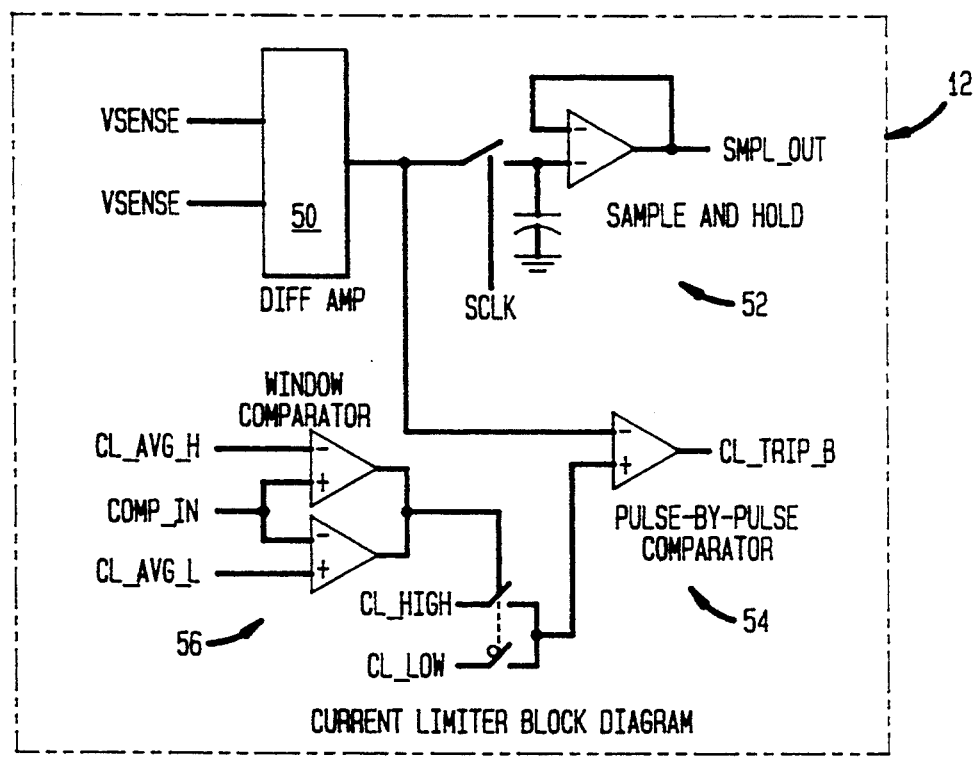
FIG. 2 is a block diagram of a current limiter circuit on the chip.

A block diagram of the current limiter 12 is shown in FIG. 2. The purpose of the current limiter section is to provide protection for both the FET's and the motor windings. A high current is allowed to flow during start-up and then the limit is switched to a lower current limit mode to prevent excessive power dissipation in the drive FET's and motor windings. Differential amplifier 50 receives input signals Vsense and Vsense_. The output of differential amplifier 50 is fed to sample and hold circuit 52 and to pulse-by-pulse comparator 54. The other input to comparator 54 is provided by window comparator 56. The switch over from a high current limit to a low current limit is preferably controlled by an external RC time constant and the window comparator 56. The high and low current limit values are established by way of off-chip voltage sources.

Figure 3:
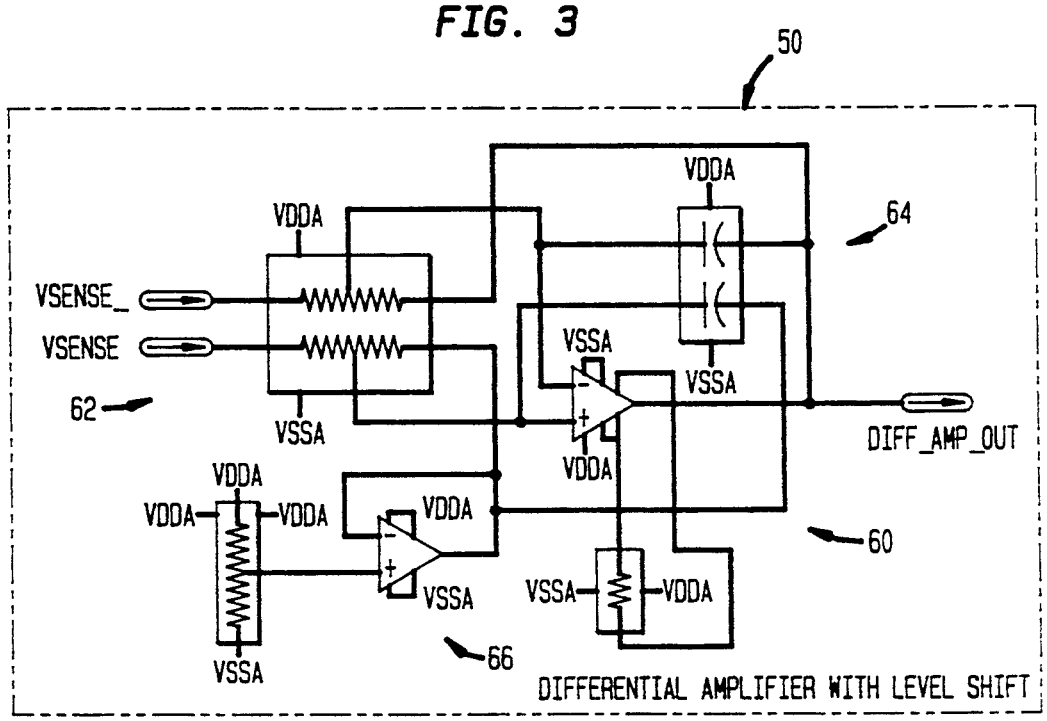
FIG. 3 is a schematic diagram of the differential amplifier sub-block.

FIG. 3 is a schematic diagram of the differential amplifier section. As mentioned previously, the input to the differential amplifier is at the Vsense and Vsense_ pins of the chip. Preferably the voltage is developed across an external sense resistor (not shown) which is proportional to the current of the motor winding. In the embodiment discussed here, the voltage across the sense resistor is a signal with a duty cycle between 0% and 100% and an amplitude that varies between 0 and 1.2 volts.

The differential amplifier section 50 comprises an operational amplifier 60, matching resistors indicated at 62 with nominally a DC gain of 2 and a minimum closed-loop bandwidth of 300 kHz. Capacitors 64 suppress unwanted oscillation. Level shift circuitry indicated at 66 is provided to shift the sense voltage by approximately 500 mV to minimize any gain error of the amplifier.

Figure 4:
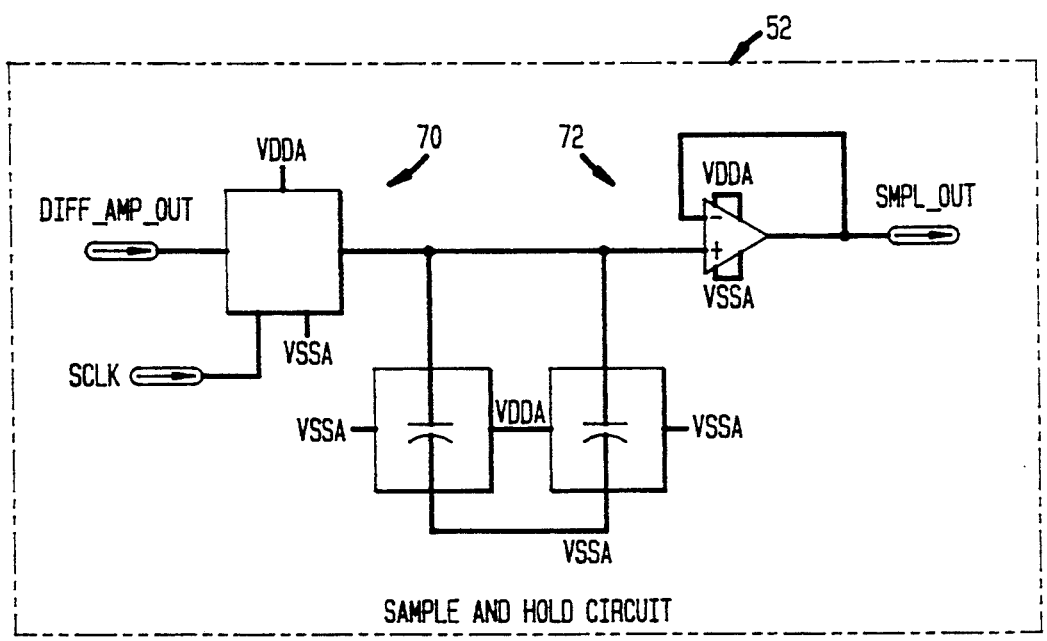
FIG. 4 is a schematic diagram of the sample and hold circuit sub-block.

FIG. 4 is a schematic diagram of the sample and hold circuit 52. It will be appreciated that the output of the differential amplifier segment 50 represents an instantaneous current in a motor winding only during the FET on-time. In the preferred embodiment, it is sampled during each of the PWM cycles and only when a source output is active in order to generate the peak envelope of the instantaneous motor current. As will be discussed below, the sample clock is generated as long as a source output is on except for the blanking period. The sampled output is fed from block 70 to operational amplifier 72. Preferably, the 3 time constant of the input sample and hold circuit is set to be less than the minimum sample clock period (here 400 ns).

Figure 5:
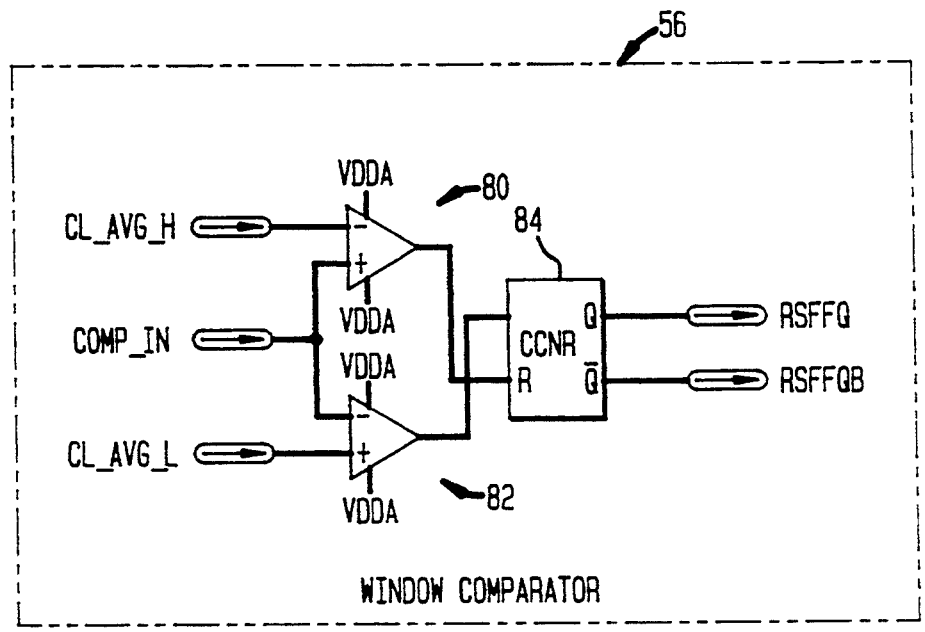
FIG. 5 is a schematic diagram of the window comparator sub-block.

FIG. 5 is a schematic diagram of the window comparator 56. As seen in FIG. 5, a signal COMP_IN is applied to the respective inputs of two op-amps 80 and 82. In the present embodiment this signal is the average voltage of the sampled motor current. Two off-chip voltages are applied to the other inputs of the comparators; the CL_AVG_H to comparators 80 and CL_AVG_L to comparator 82. The difference between CL_AVG_L and CL_AVG_H provides hysteresis. The outputs of the comparators are fed as shown to flip-flop 84 which applies either CL_LOW or CL_HIGH to the pulse by pulse comparator 54 via 2 analog switches.

It will be appreciated that the window comparator 56 dynamically determines the mode of high or low current limit operation, based on the input voltage applied to the COMP_IN pin and the off-chip voltages. After power-up, the window comparator output is high and the high-current limit mode is activated since the COMP_IN voltage is lower than the CL_AVG_L voltage. If the COMP_IN voltage increases and eventually becomes higher than the CL_AVG_H voltage level, the output of the comparator becomes low and the current limiter folds back to a low-current limit mode. The low-current limit mode is kept activated until the COMP_IN voltage decreases below the CL_AVG_L level at which point the high current mode is switched back again.

Figure 6:
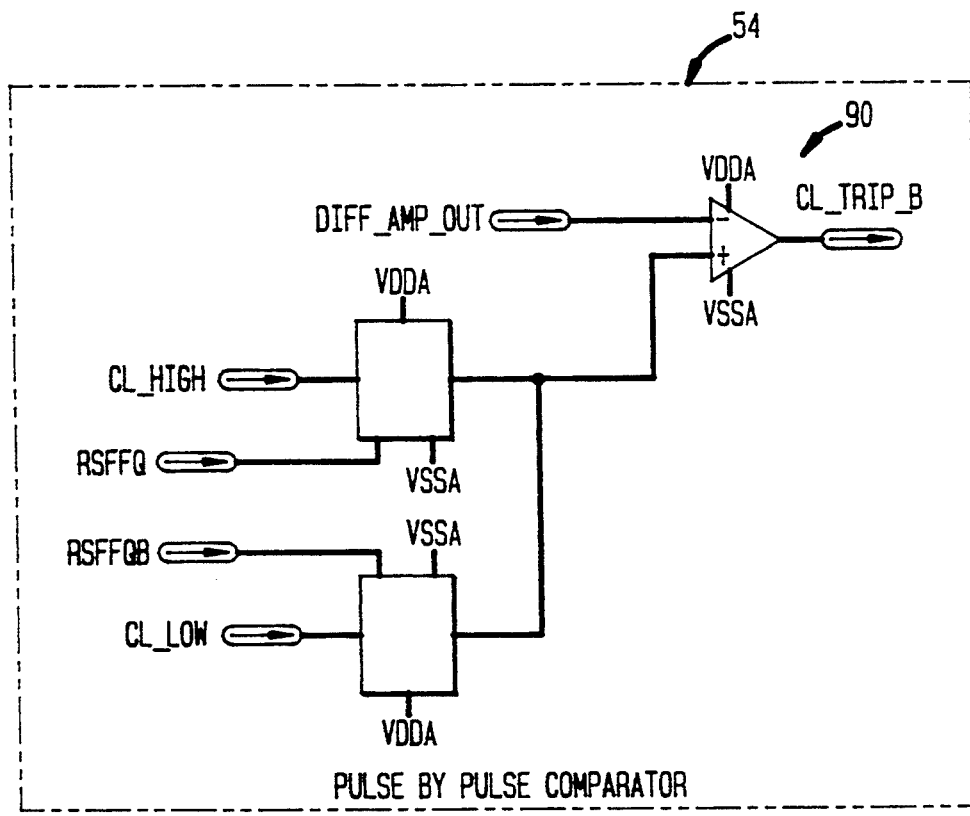
FIG. 6 is a schematic diagram of the pulse by pulse comparator sub-block.

FIG. 6 is a schematic of the pulse by pulse comparator circuit 54. The purpose of the pulse by pulse comparator 54 is to compare the output of the differential amplifier 50 with either one of the off-chip reference voltages selected by the the window comparator 56. The output of the differential amplifier is fed to one input of comparator 90 while the other input receives the selected input based on the output of the window comparator. If the signal RSFFQ is high, then the output of the differential amplifier is compared against the off-chip high current limit reference value CL_HIGH. If the output of the window comparator is low, then the output of the differential amplifier is compared against the off-chip low-current reference value, CL_LOW.

Figure 7:
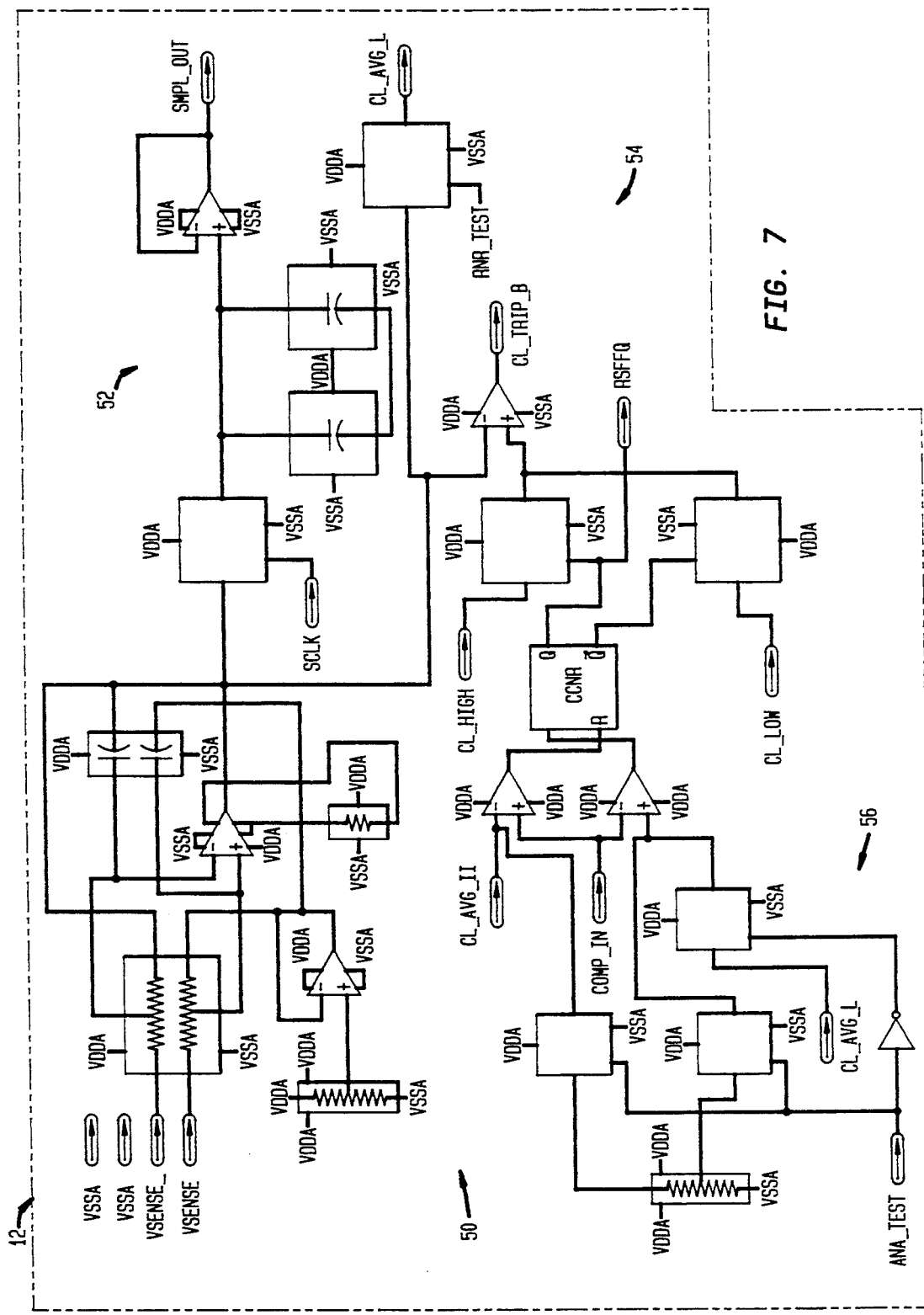
FIG. 7 is an overall schematic diagram of the current limiter section of the chip in accordance with the invention.

It will be appreciated that the output of the comparator 54, CL_TRIP_B, is an active low signal which indicates that the output of the differential amplifier representing the instantaneous motor current exceeded the limit value, either CL_HIGH or CL_LOW. The overall schematic diagram of the current limiter functional block is shown in FIG. 7 and will not be discussed further in view of the foregoing explanation of its various parts.

Figure 8:
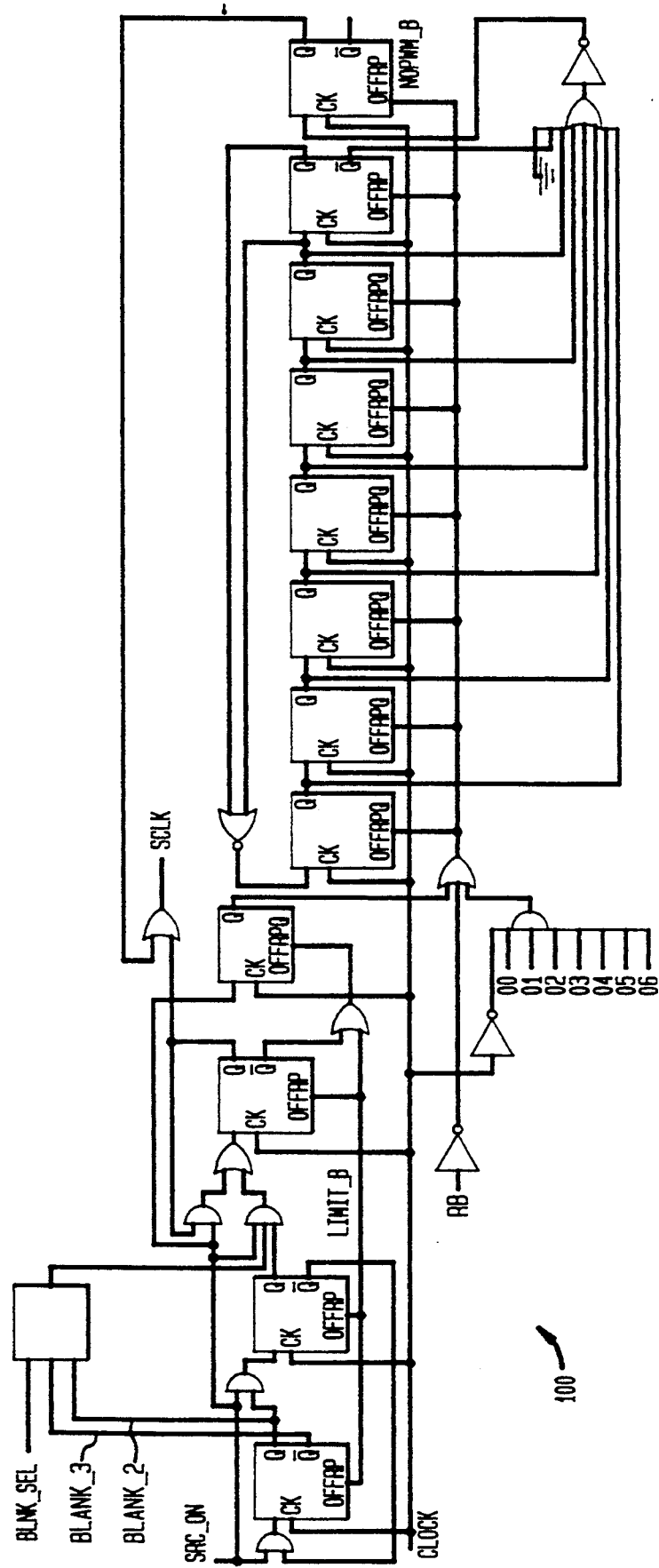
FIG. 8 is a schematic diagram of the sample clock generator.

FIG. 8 illustrates at 100 a schematic diagram of the logic of the sample clock generator circuit. The clock generates a sample pulse with each rising edge of the PWM signal. The first three clock periods after the rising edge of the PWM signal are blanked by the blanking input shown at block 102. The purpose of the blanking period is to avoid sampling the motor current when the power FET starts to turn on. The blanking period is suitably set at a default of three clock periods to exceed the settling time of the motor current. It will be appreciated that the blanking period may be changed to two clock periods by wire bonding the BLNK_SEL pin which inputs to block 102 to GND.

Figure 9:
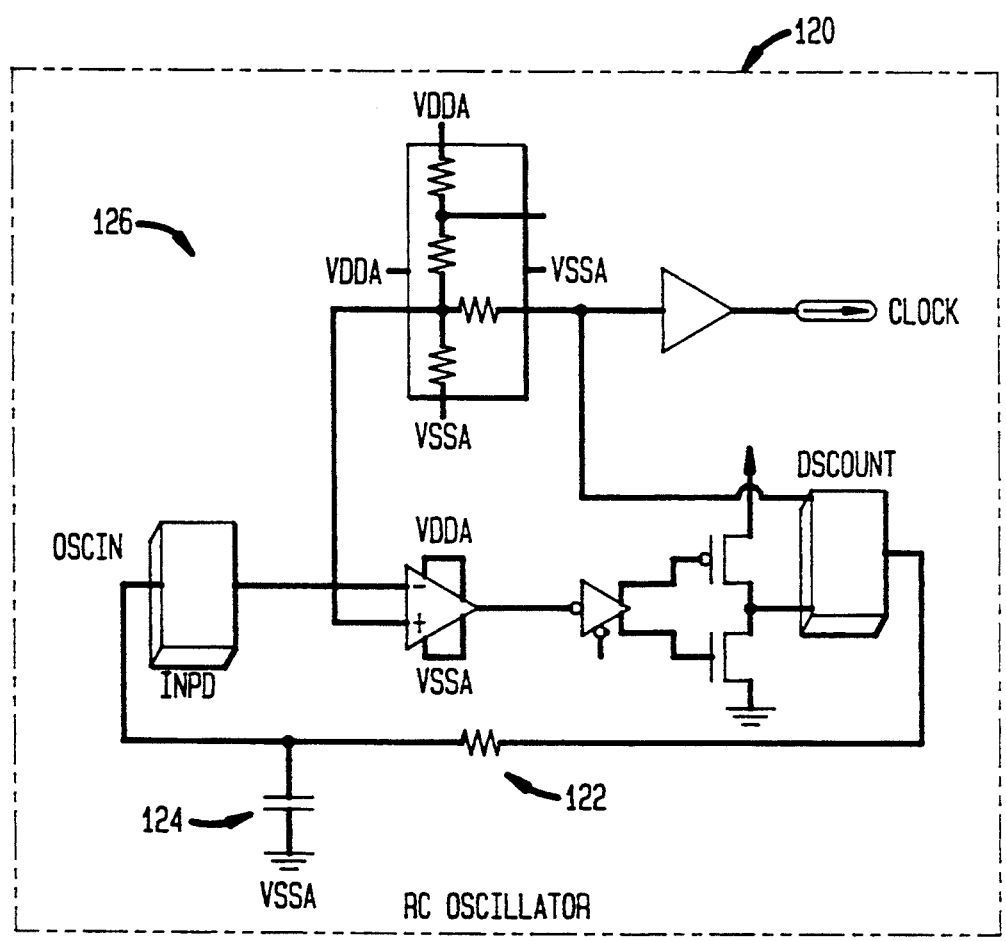
FIG. 9 is a schematic of a suitable RC oscillator.

FIG. 9 is a schematic diagram of the RC oscillator 120 which provides a clock reference for the chip. The illustrated circuit may be used either as a crystal/resonator controlled oscillator or as an RC controlled oscillator. For the RC oscillator mode illustrated, external resistor 122 is connected between the OSCOUT and OSCIN pins and a capacitor 124 is connected externally between the OSCIN pin and ground. It will be understood that in the RC oscillator mode, the amplifier design becomes a comparator-oscillator type with both positive and negative feedback. The positive feedback is accomplished through the internal hysteresis network indicated at 126 and the negative feedback is accomplished through the external resistor 122. Capacitor 124 is charged or discharged through the external resistor and thus determines with the external resistor 122 the time constant. Thus the time constant and the hysteresis voltage is the basis for oscillation.

Figure 10:
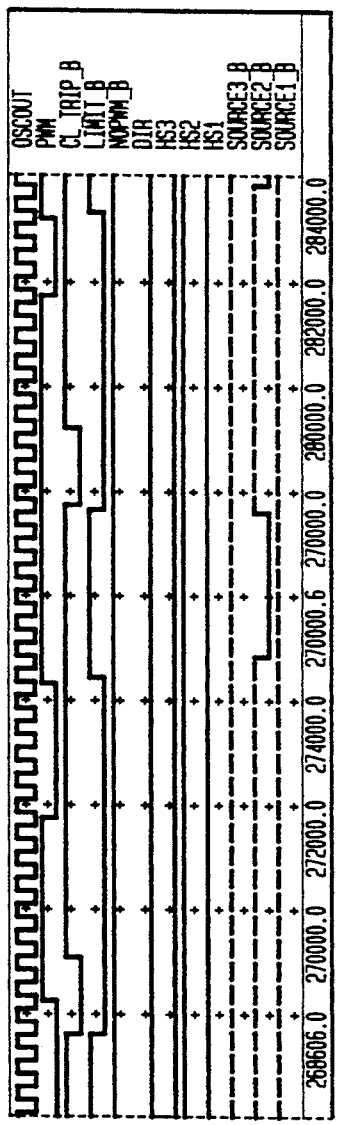
FIG. 10 is a timing diagram of the CL_TRIP_B signal.

FIG. 10 is a timing diagram of the CL_TRIP_B signal. It will be understood from the foregoing that typically the CL_TRIP_B signal is active for a short period of time (less than the PWM period). Thus the CL_TRIP_B signal is latched to stop the motor current for the remainder of the PWM period. In FIG. 10 this latched signal is called LIMIT_B. The latch is released at the next rising edge of the PWM signal and the motor current may start to flow again.

It will however be appreciated that if the PWM is greater than 99% duty cycle so that the next rising edge of the PWM is not detected by circuit, the latch will not be released until more than 132 clock periods, that is approximately 1.5 PWM period, are exhausted counting from the last rising edge. It should be noted also that if the CL_TRIP_B is activated during a blanking period, it is not recognized until the blanking period is completed.

Figure 11:
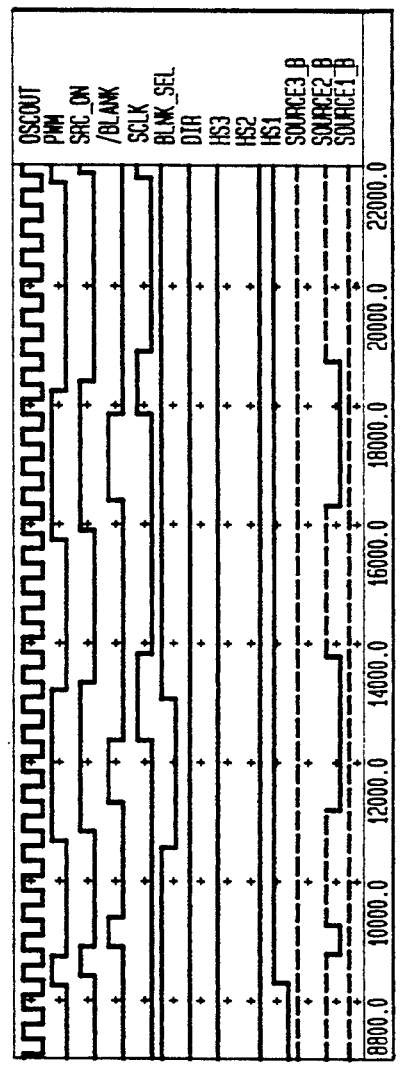
FIG. 11 is a timing diagram of the sample clock generator.

FIG. 11 is a timing diagram of the sample clock generator. It will be recalled from the previous discussion of the sample clock generator circuit that the first three clock periods after the rising edge of the PWM signal are blanked. In FIG. 11 the sample clock output is labelled as SCLK. At the first rising edge of the PWM signal no sample is generated since the PWM width is less than the blanking period. The second case shows the sample clock with 2 clock period blanking and the last illustrated case shows that the sample clock is generated after the 3 clock period blanking period.

The sample clock is active high as long as the PWM signal is high. The sample clock is disabled if the current limit is activated, but the sample clock is re-generated after the 132 clock periods from the last rising edge as long as the PWM is high. It will be understood that even if the PWM signal is either below 1% duty cycle or even 0% duty cycle, the sample clock is generated for the purpose of refreshing the sample and hold circuit capacitor. In this case the sample clock is only one clock period wide and is activated every 132 clock periods so long as the PWM is below 1% duty cycle.

Figure 12:
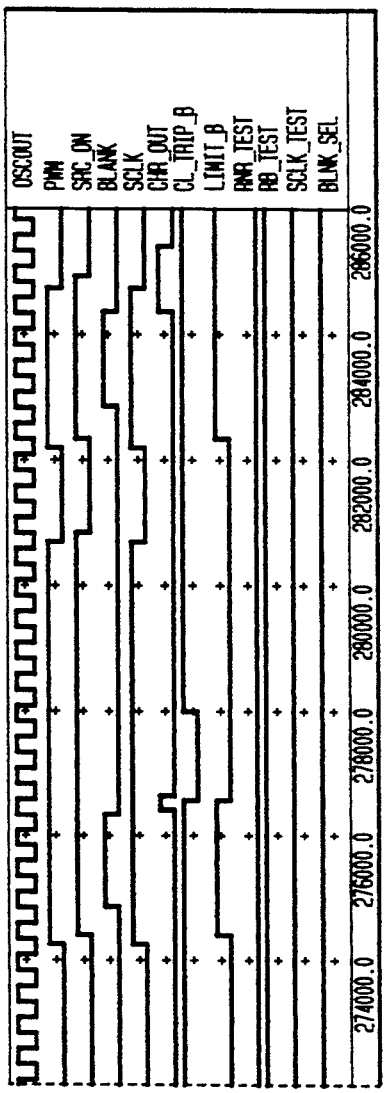
FIG. 12 is a timing diagram of the sample clock generator with the CL_TRIP_B signal.

FIG. 12 is a timing diagram of the sample clock generator with the CL_TRIP_B signal. As seen in this Figure, the sample clock is turned off when the CL_TRIP_B signal is active. This serves to ensure that the sample clock is only valid when the SOURCE_B signal is active. The sample clock is active high again on the next rising edge of the PWM signal.

Figure 13:
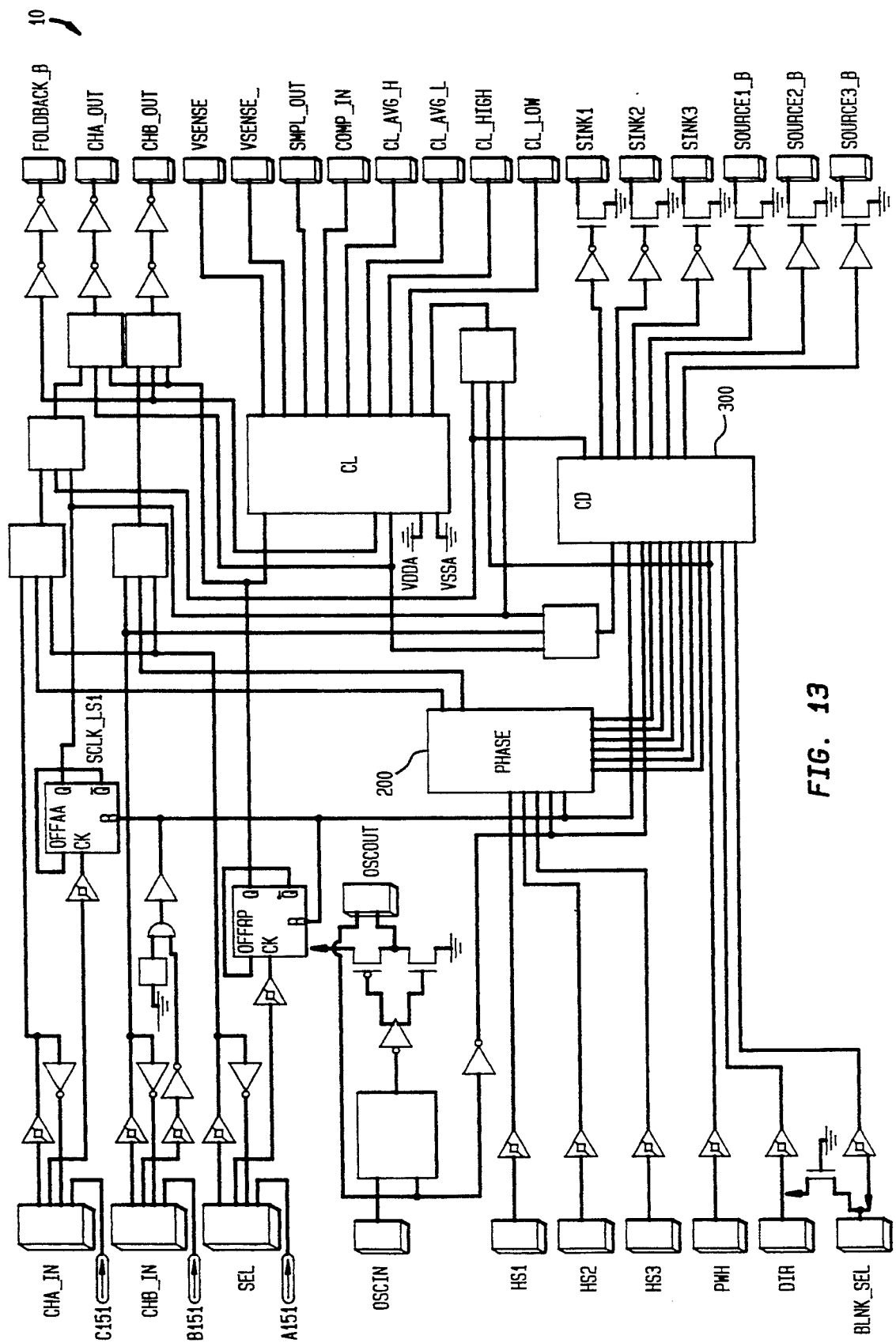
FIG. 13 is an overall schematic diagram of the chip in accordance with the invention.

FIG. 13 is an overall schematic diagram of the integrated circuit chip 10. The various pins are shown along with a description in Table 1. The various input and output signals are buffered in conventional manner and the various components correspond in general to the block diagram of FIG. 1 so that it is not believed necessary to detail the various logic gates and flip-flops connecting the various parts of the circuit. It will be necessary to describe in more detail the block 200 labelled PHASE and the commutation decoder circuit 300 labelled CD.

TABLE I

| # | Pin Name | I/O | Description |
|---|---|---|---|
| 1 | VSS | Digital ground | Digital ground |
| 2 | HS2 | Input | Hall sensor input 2 |
| 3 | HS1 | Input | Hall sensor input 1 |
| 4 | PWM | Input | PWM input, active high |
| 5 | DIR | Input | Direction input |
| 6 | CHA_OUT | Output | Phase output A |
| 7 | CHB_OUT | Output | Phase output B |
| 8 | VDD | Digital power | Digital supply voltage |
| 9 | FOLDBACK_B | Output | Current Limit Mode (optional) |
| 10 | OSCOUT | Output | RC oscillator output |
| 11 | OSCIN | Input | RC oscillator input |
| 12 | CL_AVG_L | Input | Average current limit low trip point |
| 13 | CL_AVG_H | Input | Average current limit high trip point |
| 14 | CL_LOW | Input | Low current limit voltage |
| 15 | CL_HIGH | Input | High current limit voltage |
| 16 | SMPL_OUT | Output | Sampling switch output |
| 17 | VSSA | Analog ground | Analog ground |
| 18 | COMP_IN | Input | Average current limit comparator |
| 19 | VSENSE | Input | Plus input to diff-amplifier |
| 20 | VSENSE_ | Input | Minus input to diff-amplifier |
| 21 | VDDA | Analog power | Analog supply voltage |
| 22 | SOURCE1_B | Output | 60 V open drain pin |
| 23 | SINK1 | Output | 18 V open drain pin |
| 24 | SOURCE2_B | Output | 60 V open drain pin |
| 25 | GND | Analog ground | Ground for open drain pins only |
| 26 | SINK2 | Output | 18 V open drain pin |
| 27 | SOURCE3_B | Output | 60 V open drain pin |
| 28 | SINK3 | Output | 18 V open drain pin |
| 29 | SEL | Input | Select phase inputs |
| 30 | CHA_IN | Input | Phase input A |
| 31 | CHB_IN | Input | Phase input B |
| 32 | HS3 | Input | Hall sensor input 3 |
| 33 | BLNK SEL | Input w/pull-up | Select blank pulse width (optional) |

Figure 14A:
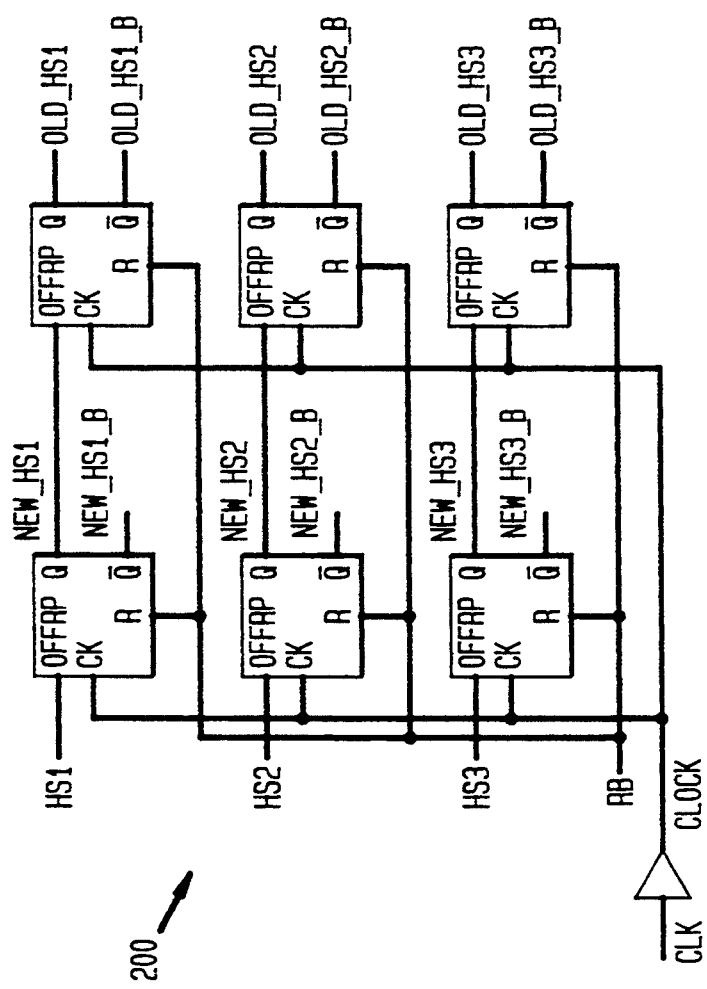
FIGS. 14A, 14B and 14C comprise a schematic diagram of the phase generator sub-block.
Figure 14B:
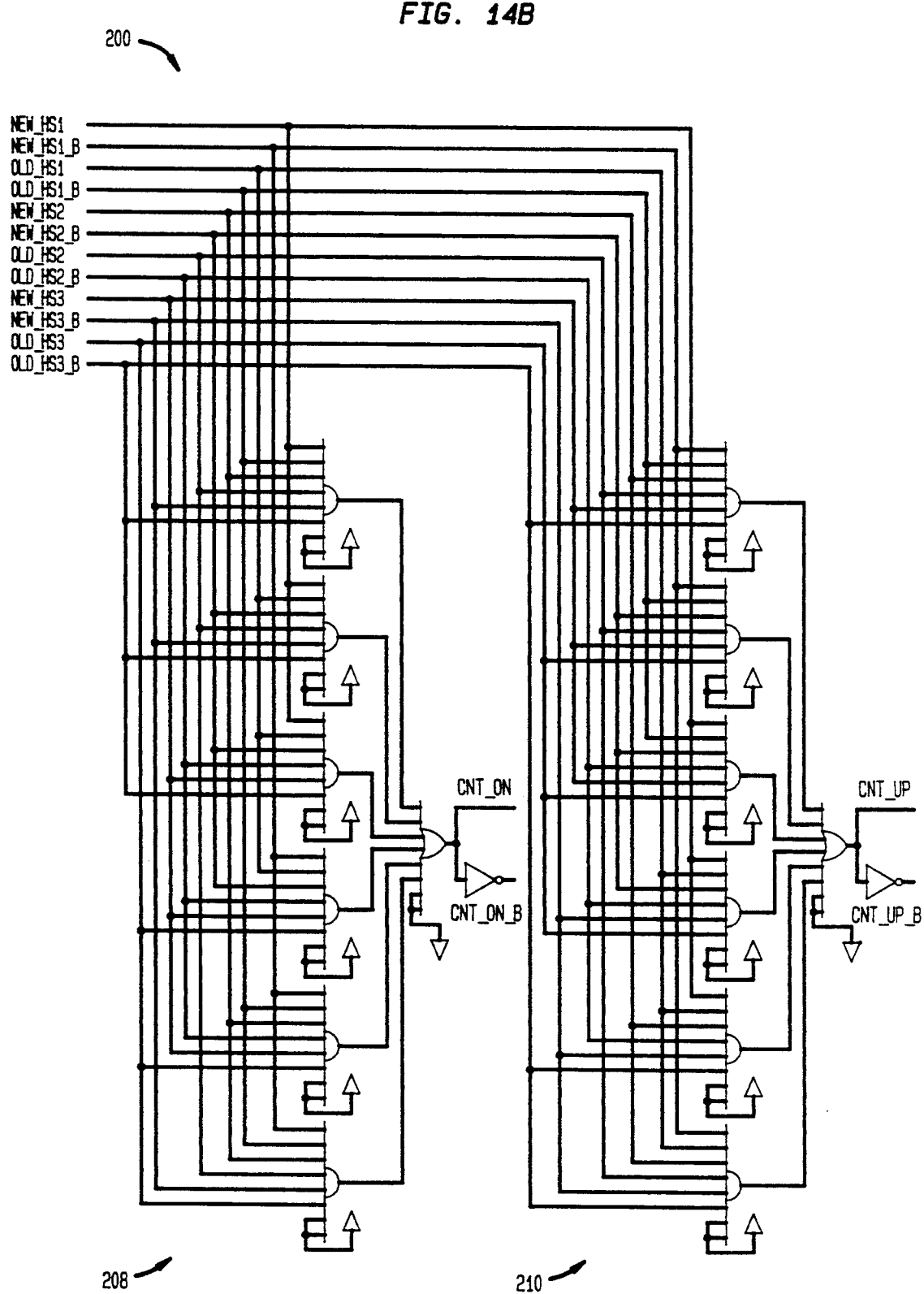
Figure 14C:
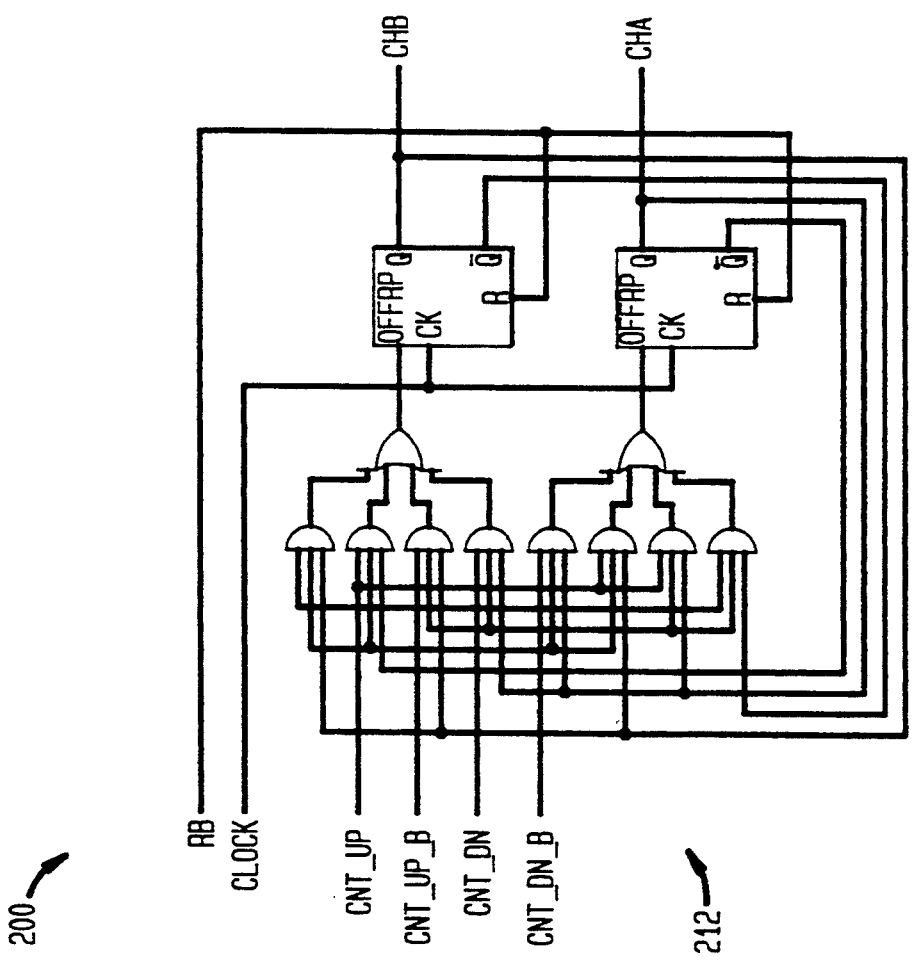

FIGS. 14A, 14B and 14C comprise the schematic diagram of the phase sub-block. In FIG. 14A the inputs from the Hall-effect sensors on the motor are received and clocked into shift registers so as to provide both new and old values for the transitions of the sensors. As seen in FIG. 14B these new and old sensor states are applied to logic arrays shown at 208 and 210 for the purpose of generating CNT_DN and CNT_UP signals respectively. In FIG. 14C these signals are in turn applied to logic array to generate quadrature output signals CHB and CHA as the output of flip-flops 214 and 216 respectively. These outputs are selectively applied to output pins 6 and 7 of the chip as shown in FIG. 13 whenever the SEL input is high. Further details of a quadrature signal generator as shown here may be obtained from U.S. patent application Ser. No. 08/018,599 entitled METHOD AND APPARATUS FOR GENERATING A QUADRATURE SIGNAL USING COMMUTATION SENSORS (Atty. Docket No. C-959) filed on even date herewith and assigned to the assignee of the present invention now abandoned. When the SEL multiplexer input is low, the quadrature encoder signals are driven directly from the external optical encoder.

Figure 15:
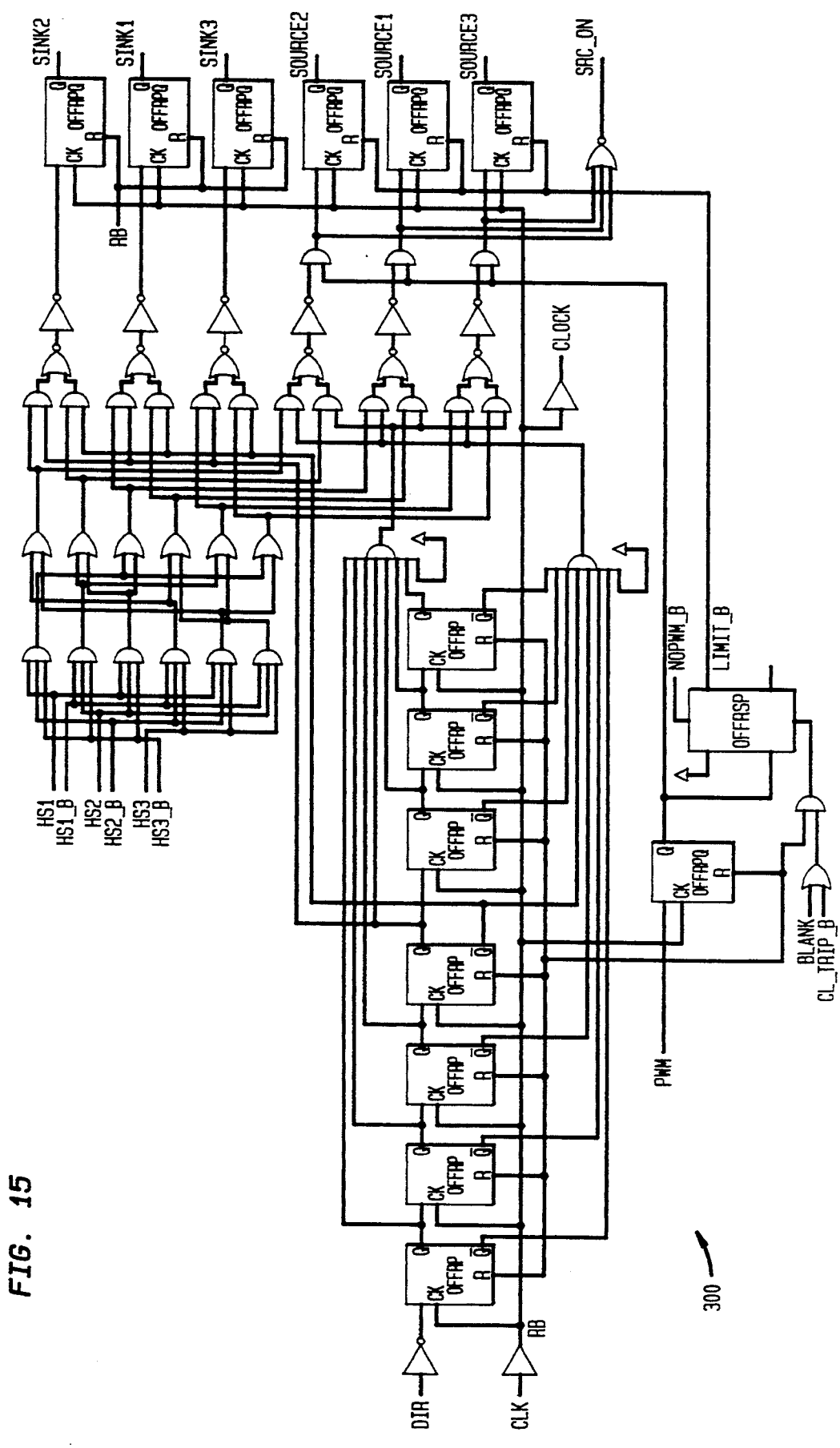
FIG. 15 is a schematic diagram of the commutation decoder.

FIG. 15 is a schematic diagram of the commutation decoder circuit. The sensor outputs from the phase circuit 200 are also sent to the commutation decoder circuit 300 along with the DIR and CLK and PWM signals and applied to the logic arrays as illustrated in order to provide appropriate commutation signals to the motor. For a discussion of the commutation approach see U.S. patent application Ser. No. 08/018,600 entitled A BRUSHLESS MOTOR HAVING A PROGRAMMABLE LOGIC DEVICE FOR COMMUTATION (Atty. Docket No. C-960) filed on even date herewith and assigned to the assignee of the present invention now U.S. Pat. No. 5,319,291.

The commutation decoder receives the Hall-effect sensor inputs and decodes them to a switching sequence for the motor driver FET's. The Hall-effect sensor inputs and switching sequence outputs are grey-coded. Table 2 shows a decoding truth table for the direction control (DIR) input low. For a reverse rotation (DIR input high), states of the switching sequences become exchanged (not reversed) as shown in Table 3. The logic state (0 or 1) in the tables represents the SINK or SOURCE_B output of the integrated circuit chip with external pull-up resistors.

TABLE 2

Commutation decoder truth table (DIR = 0)

| State | Sensor Input | | | SOURCE_B Output | | | SINK Output | | |
|---|---|---|---|---|---|---|---|---|---|
| | HS1 | HS2 | HS3 | 1 | 2 | 3 | 1 | 2 | 3 |
| 3 | 1 | 1 | 0 | 1 | 0 | 1 | 1 | 0 | 0 |
| 1 | 1 | 0 | 0 | 1 | 1 | 0 | 1 | 0 | 0 |
| 5 | 1 | 0 | 1 | 1 | 1 | 0 | 0 | 1 | 0 |
| 4 | 0 | 0 | 1 | 0 | 1 | 1 | 0 | 1 | 0 |
| 6 | 0 | 1 | 1 | 0 | 1 | 1 | 0 | 0 | 1 |
| 2 | 0 | 1 | 0 | 1 | 0 | 1 | 0 | 0 | 1 |

TABLE 2

Commutation decoder truth table (DIR = 1)

| State | Sensor Input | | | SOURCE_B Output | | | SINK Output | | |
|---|---|---|---|---|---|---|---|---|---|
| | HS1 | HS2 | HS3 | 1 | 2 | 3 | 1 | 2 | 3 |
| 3 | 1 | 1 | 0 | 0 | 1 | 1 | 0 | 1 | 0 |
| 2 | 0 | 1 | 0 | 1 | 0 | 1 | 0 | 1 | 0 |
| 6 | 0 | 1 | 1 | 1 | 1 | 0 | 1 | 0 | 0 |
| 4 | 0 | 0 | 1 | 1 | 0 | 1 | 1 | 0 | 0 |
| 5 | 1 | 0 | 1 | 1 | 0 | 1 | 0 | 0 | 1 |
| 1 | 1 | 0 | 0 | 0 | 1 | 1 | 0 | 0 | 1 |

The SINK or SOURCE_B outputs are open drain pins in this embodiment. The SOURCE_B output may be connected to a 50 V power supply through pull-up resistors and bias the gate input of a P-channel power FET. The SINK output pins may be connected to an 12 V power supply through a pull-up resistor and connected to the gate input of an N-channel power FET. Accordingly for this embodiment it is defined that the SOURCE_B outputs should be active low (logic 0) to turn on P-channel power FET's and the SINK outputs should be active high (logic 1) in order to turn on N-channel power FET's.

At every state of the Hall-effect sensor, only one output is turned on for each of the SINK and SOURCE_B group. For example, at state 3 in Table 2, SINK 2 is on (logic 1) and SOURCE1_B is on (logic 0), but all other outputs are off. As the state of the Hall-effect sensor progresses from the top to the bottom of the Table, it is observed that only two outputs are changing their on/off states in one group, either from SINK group or SOURCE_B group, but not both. For example, if the state 3 progresses to state 2 in Table 3, then the two outputs of the SOURCE_B group are changing, but all the SINK outputs do not change their states.

The SOURCE_B outputs are always gated with the PWM input. Therefore if the PWM is low, the SOURCE outputs are always off (logic 1). On the other hand, the SINK outputs are independent of the PWM input. All SOURCE_B and SINK outputs are synchronous with the rising edge of the OSCOUT clock signal. However, if the current limit condition is detected, the SOURCE_B outputs are turned off asynchronously, but the SINK outputs are not affected.

Figure 16:
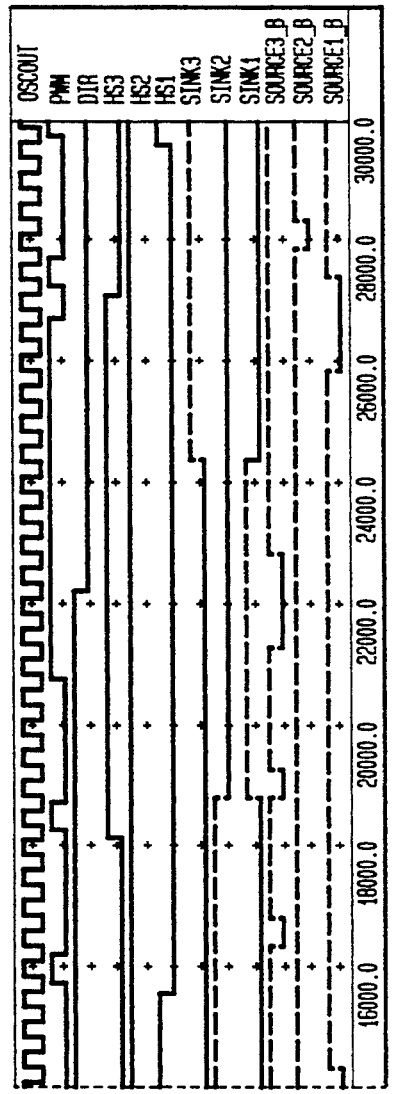
FIG. 16 is a timing diagram of the dead time generator.

FIG. 16 is a timing diagram of the dead time generator circuit of the commutation decode circuit 300. The purpose of the dead time generator is to eliminate the heavy current spike when the motor changes its direction and all output driver polarities reverse. The undesired current spiking occurs because the motor driver FET is not completely turned off when its complementary device is turned on. As can be seen from the schematic of FIG. 15, during the direction reversal, any SOURCE_B outputs are turned off temporarily for six cycles as seen in FIG. 16. After the first 3 clock cycles, the SINK outputs change their on/off state according to Tables 2 and 3. Therefore at least 3 clock cycles have passed between SOURCE_B turn-off and SINK turn-on or visa versa. At the end of the sixth cycle, the SOURCE_B output is turned back on. It will be understood that the 3 clock-cycle delay is calculated to exceed the worst case turn-off time of the motor driver FET's (maximum 1200 ns).

What is claimed is:

1. An integrated circuit driver for a brushless motor having encoder means comprising a plurality of Hall-effect sensors operative for providing commutation information to a motor controller, the integrated circuit comprising means for decoding the commutation information from the Hall-effect sensors, output means connected to said decoding means, said output means being operative for providing switching signals in accordance with the decoded commutation information, an analog current limiter, said current limiter including means for dynamically switching the current limit values for current in the motor between a high current limit value and a low current limit value, wherein the decoder means receives a PWM signal for providing commutation switching information and wherein the output of the pulse-by-pulse comparator is released at a rising edge of the PWM signal and is thereafter latched to prevent motor current for the remainder of the active PWM signal, and timing means for providing clock pulses wherein if the next rising edge of the PWM signal is not detected, output of the pulse-by-pulse comparator cannot be unlatched for a predetermined number of clock cycles.

2. The integrated circuit driver of claim 1 further comprising connecting means for receiving said high current limit value and said low current limit value from respective external sources.

3. The integrated circuit driver of claim 1 wherein the current limiter includes a means for receiving a voltage input that periodically corresponds to current through the motor and for providing an instantaneous output that continuously corresponds to the motor current.

4. The integrated circuit driver of claim 3 wherein the means for dynamically switching the current limit values includes a window comparator for comparing a quantified voltage parameter of a sampled motor current sensor to a high or low voltage such that the high current limit is activated when the quantified voltage is lower than the low current limit voltage and the low current limit voltage is activated when the quantified voltage parameter passes the high current limit voltage.

5. The integrated circuit driver of claim 4 wherein the analog current limiter circuit includes a pulse-by-pulse comparator for comparing the output of the differential amplifier to a high or low voltage limit as selected by the window comparator to provide a current limit signal output.

6. The integrated circuit of claim 1 further comprising a quadrature encoder wherein said quadrature generates quadrature signals from hall sensors used for commutation.

7. The integrated circuit of claim 6 further comprising means for receiving external quadrature signals and means for selecting the source of the quadrature signals to be output.

8. The integrated circuit of claim 1 further comprising means to provide 50 v open drain pins for single 5 v supply, allowing a direct on/off control of the high voltage FETs.

9. The integrated circuit of claim 1 further comprising means to accept a 7 v as test inputs as well as 5 v inputs, doubling usable pin counts of the chip.

10. The integrated circuit of claim 1 further comprising means to allow the analog current limiter to generate a signal indicating that the low current limit has been activated, so that the motor driver FETs can be further protected from damage.

11. The integrated circuit of claim 1 further comprising means to provide an oscillator through an on-chip hysteresis network and a comparator, so that the accuracy of the oscillation is largely dependent upon the external components only.

* * * * *